(12) United States Patent
Gusikhin et al.

(10) Patent No.: US 10,580,386 B2
(45) Date of Patent: Mar. 3, 2020

(54) IN-VEHICLE PROJECTED REALITY MOTION CORRECTION

(71) Applicant: Ford Global Technologies, LLC, Dearborn, MI (US)

(72) Inventors: Oleg Yurievitch Gusikhin, Dearborn, MI (US); Omar Makke, Lyon Township, MI (US); Patrick Lawrence Jackson Van Hoecke, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 15/494,053

(22) Filed: Apr. 21, 2017

(65) Prior Publication Data

US 2018/0308454 A1    Oct. 25, 2018

(51) Int. Cl.
| | |
|---|---|
| *G09G 5/12* | (2006.01) |
| *G09G 3/00* | (2006.01) |
| *G02B 27/01* | (2006.01) |
| *G02B 27/00* | (2006.01) |
| *G09G 3/20* | (2006.01) |
| *H04N 9/31* | (2006.01) |

(52) U.S. Cl.
CPC ........... *G09G 5/12* (2013.01); *G02B 27/0093* (2013.01); *G02B 27/017* (2013.01); *G09G 3/002* (2013.01); *G09G 3/2003* (2013.01); *H04N 9/3179* (2013.01); *G02B 2027/0181* (2013.01); *G02B 2027/0187* (2013.01); *G09G 2380/10* (2013.01)

(58) Field of Classification Search
CPC ..... G09G 5/12; G09G 2380/10; H04N 9/3179
See application file for complete search history.

(56) References Cited

U.S. PATENT DOCUMENTS

| | | | | |
|---|---|---|---|---|
| 4,649,504 | A * | 3/1987 | Krouglicof | G01S 5/163 340/980 |
| 7,084,859 | B1 * | 8/2006 | Pryor | G01C 21/3664 345/156 |
| 7,246,050 | B2 | 7/2007 | Sheridan | |
| 7,301,547 | B2 * | 11/2007 | Martins | G06T 19/00 345/419 |
| 7,722,526 | B2 | 5/2010 | Kim | |

(Continued)

FOREIGN PATENT DOCUMENTS

| | | |
|---|---|---|
| EP | 2362261 A1 | 8/2011 |
| WO | WO 2018117574 A1 | 6/2018 |

OTHER PUBLICATIONS

Search Report dated Sep. 28, 2018 for GB Patent Application No. GB 1806479.0 (3 pages).

*Primary Examiner* — Grant Sitta
(74) *Attorney, Agent, or Firm* — Frank Lollo; Eversheds Sutherland (US) LLP

(57) ABSTRACT

Method and apparatus are disclosed for stabilizing in-vehicle projected reality. An example in-vehicle projected reality system includes headset for displaying a projected reality image. The system also includes a localizer device for determining a headset pose in the vehicle. The system also includes a computing device for receiving the headset pose, receiving vehicle inertial data, determining a stabilized image based on the received headset pose and vehicle inertial data, and providing the stabilized image to the headset.

19 Claims, 4 Drawing Sheets

(56) References Cited

U.S. PATENT DOCUMENTS

| | | | | |
|---|---|---|---|---|
| 8,010,308 B1* | 8/2011 | Churchill | | G01C 25/005 |
| | | | | 702/104 |
| 9,547,179 B2 | 1/2017 | Alaniz et al. | | |
| 9,659,411 B2* | 5/2017 | Thomas | | G02B 27/017 |
| 9,866,286 B1* | 1/2018 | Qu | | G01S 17/89 |
| 10,191,561 B2* | 1/2019 | Katz | | G06F 3/0304 |
| 10,349,031 B2* | 7/2019 | DeLuca | | H04N 13/332 |
| 10,372,237 B2* | 8/2019 | Banning | | G06F 3/0346 |
| 2004/0149036 A1* | 8/2004 | Foxlin | | A61B 5/1113 |
| | | | | 73/511 |
| 2005/0105772 A1* | 5/2005 | Voronka | | G06F 3/017 |
| | | | | 382/103 |
| 2010/0109976 A1* | 5/2010 | Gilbert | | F41G 3/225 |
| | | | | 345/8 |
| 2011/0019203 A1* | 1/2011 | Taguchi | | G02B 5/32 |
| | | | | 356/614 |
| 2012/0173069 A1* | 7/2012 | Tsimhoni | | G01C 21/365 |
| | | | | 701/25 |
| 2013/0076787 A1* | 3/2013 | Mathieu | | B60R 1/00 |
| | | | | 345/633 |
| 2013/0083061 A1* | 4/2013 | Mishra | | H04N 5/265 |
| | | | | 345/633 |
| 2013/0188258 A1* | 7/2013 | Mathieu | | G08G 1/165 |
| | | | | 359/630 |
| 2013/0238277 A1* | 9/2013 | Sasakura | | G01C 19/5776 |
| | | | | 702/141 |
| 2013/0249942 A1* | 9/2013 | Green | | G06F 3/14 |
| | | | | 345/633 |
| 2014/0336970 A1* | 11/2014 | Troni-Peralta | | G01C 25/00 |
| | | | | 702/96 |
| 2015/0097860 A1* | 4/2015 | Alaniz | | G06F 3/011 |
| | | | | 345/633 |
| 2015/0317838 A1 | 11/2015 | Foxlin | | |
| 2015/0325027 A1 | 11/2015 | Herman et al. | | |
| 2016/0048027 A1 | 2/2016 | Shpigelman | | |
| 2017/0011562 A1* | 1/2017 | Hodges | | G07C 5/008 |
| 2017/0182414 A1* | 6/2017 | Oishi | | A63F 13/428 |
| 2017/0207856 A1* | 7/2017 | Blumkin | | H04B 10/503 |
| 2017/0345215 A1* | 11/2017 | Khedkar | | G06F 3/012 |
| 2018/0008141 A1* | 1/2018 | Krueger | | A61B 5/744 |
| 2018/0082482 A1* | 3/2018 | Motta | | G06T 19/006 |
| 2018/0097818 A1* | 4/2018 | Shekh-Yusef | | H04L 63/108 |
| 2018/0097975 A1* | 4/2018 | Osman | | B25J 9/1602 |
| 2018/0151000 A1* | 5/2018 | Liv | | G06F 3/012 |
| 2018/0266847 A1* | 9/2018 | Trythall | | G01C 25/005 |

\* cited by examiner

IN-VEHICLE PROJECTED REALITY MOTION CORRECTION

TECHNICAL FIELD

The present disclosure generally relates to virtual reality and augmented reality systems used in a vehicle and, more specifically, providing stabilized images to a user of the system.

BACKGROUND

Virtual and augmented reality systems project or display an image to a user, typically via a headset or head mounted device. The head mounted device may provide an immersive experience, in which a user's field of vision is completely covered by the headset. The displayed images may include a completely digital view (virtual reality) or may include information overlaid onto a field of view of the user (augmented reality).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for providing stabilized images to a user of a virtual or augmented reality system. An example disclosed in-vehicle projected reality system includes a headset for displaying a projected reality image, a localizer device for determining a headset pose in the vehicle, and a computing device. The computing device may be configured for receiving the headset pose, receiving vehicle inertial data, determining a stabilized image based on the received headset pose and vehicle inertial data, and providing the stabilized image to the headset.

An example disclosed method for stabilizing an in-vehicle projected reality image may include receiving a headset pose determined by a localizer device, the headset configured for displaying a projected reality image. The method may also include receiving vehicle inertial data, determining a stabilized image based on the received headset pose and vehicle inertial data, and providing the stabilized image to the headset.

Another example may include means for stabilizing an in-vehicle projected reality image including means for receiving a headset pose determined by a localizer device, the headset configured for displaying a projected reality image, means for receiving vehicle inertial data, means for determining a stabilized image based on the received headset pose and vehicle inertial data, and means for providing the stabilized image to the headset.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
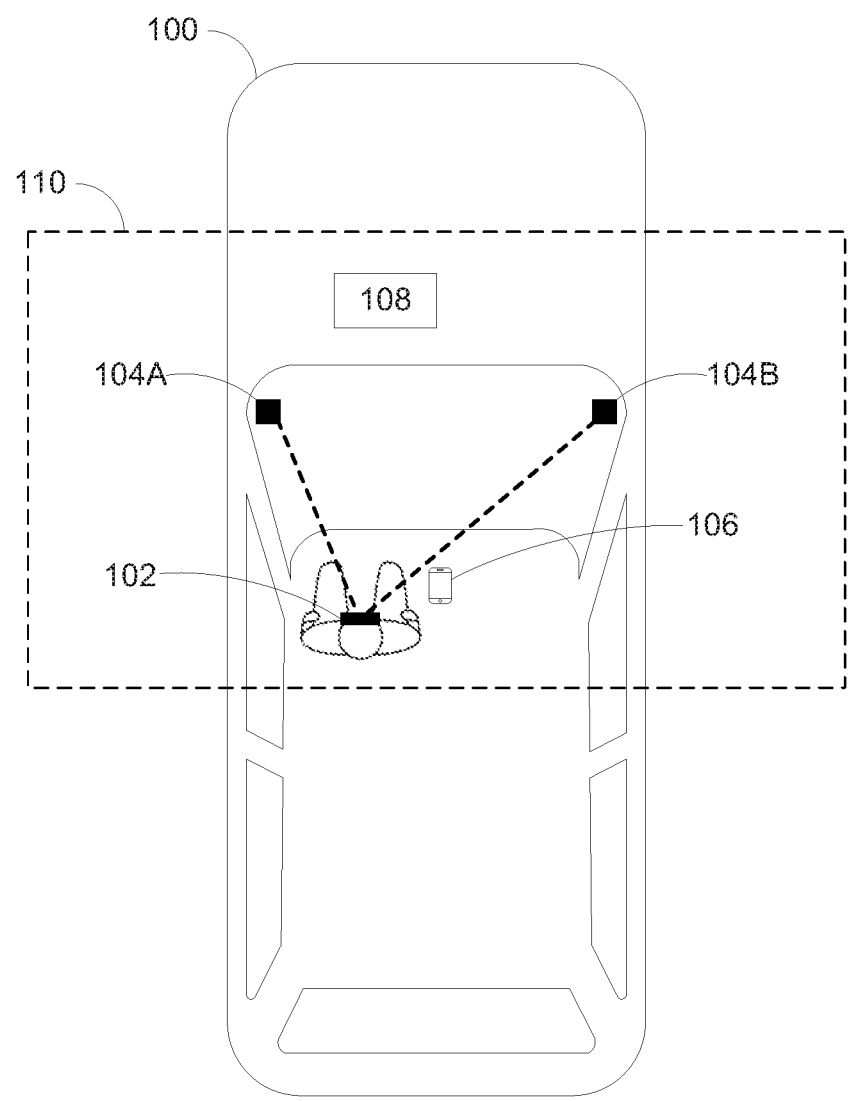
FIG. 1 illustrates an example vehicle and projected reality system according to an embodiment of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, virtual and augmented reality systems may project or display an image to a user, typically via a headset or head mounted device. In some cases, the headset may be connected with a computing device configured to process data and provide images to the user via the headset.

Typically, these systems may use a relatively high frame rate to provide a user with a seamless and smooth viewing experience. However, where the projected images are distorted, jumpy, and/or otherwise do not match a realistic world view, a user may become disoriented, motion sick, or have a bad user experience.

Image issues are particularly relevant in the context of a projected reality system used in a vehicle. As the vehicle moves it may experience changes in acceleration, steering, bumps in the road, and other forces acting on the vehicle and passengers. A projected reality system inside the vehicle, however, may provide a smooth image to a user that does not account for the forces acting on the vehicle and passengers. As a result, the user may feel the forces acting on the vehicle, but the images may not reflect those forces. And this difference between what the user feels and what the user sees may cause motion sickness or other problems with the user's projected reality experience.

With these problems in mind, examples in the present disclosure may provide appropriately stabilized images to a headset of a projected reality system that take into account the various forces acting on the vehicle and user inside the vehicle. As such, a user may view images that shake, move, and otherwise correspond to the reality of the forces acting on the user.

In one example, a headset may be used to display projected reality to a user. The projected reality may be virtual reality, augmented reality, or another type of reality. The headset may be coupled with a computing device, which may be configured to provide images for the headset to display.

The headset may receive a signal from one or more localizer devices in the vehicle. The localizer devices may be static in known positions in the vehicle, and may transmit light to the headset which may be used to determine a "pose" of the headset (e.g., the position, orientation, angles, or other metrics that may describe the headset in physical space). The headset pose (and/or data from the localizer devices) may be transmitted to the computing device.

The example system may also include one or more vehicle sensors, configured to determine various forces acting on the vehicle and passengers. The vehicle sensors may be positioned such that they detect forces acting on the localizer device positions within the vehicle. For instance, an accelerometer and/or gyroscope may be positioned in the vehicle near where the localizer devices are positioned. The vehicle sensor data may be transmitted to the computing device.

The computing device may then use the received headset pose and the received vehicle sensor data to adjust an image displayed by the headset. For instance, where the vehicle experiences sudden acceleration and the headset pose does not change or experiences a non-corresponding amount of change, the computing device may adjust the image to account for the acceleration. Alternatively, where the vehicle experiences an acceleration and the headset pose changes a corresponding amount, the computing device may not adjust the image.

FIG. 1 illustrates a vehicle 100 and example projected reality system 110 according to an example embodiment. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2) which may be a part of system 110.

System 110 may include a headset 102, one or more localizer devices 104A and 104B, a computing device 106, and a vehicle system 108.

As noted above, headset 102 may be any form factor of device configured to display a projected reality image to a user. In some examples, headset 102 may include one or more screens or displays positioned in front of a user's eyes. The screens may be attached or affixed to a head mount, such that the headset 102 comprises a head-mounted display. The headset 102 may include a single screen, multiple screens, a single or multiple images projected onto each screen or a user's eye(s), a set of glasses or goggles, a head strap, or any other component or element configured to display an image to a user while attached or affixed to the user's head.

Headset 102 may include one or more sensors configured detect incoming light or signals (e.g., from one or more localizer devices such as localizer devices 104A and 104B). The sensors and/or incoming light and signals may be used to determine a headset pose, indicating the headset position and orientation relative to the localizer devices.

Localizer devices 104A and 104B may be light emitting devices that are affixed to vehicle 100. Localizer devices 104A and 104B may be passive (i.e., not in communication with one or more other devices or systems), or may be active (i.e., in communication with headset 102 for the purpose of synchronization or timing). Localizer device 104A and 104B may emit light at particular intervals, with particular visual spread, and with other pre-determined characteristics such that headset 102 can receive the emitted light and determine the headset pose.

In one example, localizer devices 104A and 104B may emit a first omni-directional signal or flash. This may be used to initialize and synchronize the sensors on the headset and the localizer devices. Then a second signal may be transmitted in a sweeping motion horizontally across a field of view. And then a third signal may be transmitted in a sweeping motion vertically across the field of view. By receiving the initial flash and then measuring the timing differences between sensors for the vertical and horizontal sweeps, the headset (and/or communicatively coupled computing device) may determine the pose of the headset.

The location of the localizer devices 104A and 104B within vehicle 100 may be determined or selected based on a variety of factors. In some examples, the localizer devices 104A and 104B may be positioned on the dash board as far apart as possible, in order to provide the greatest difference in signal between the devices. Alternatively, the devices may be positioned based on the location of one or more inertial sensors of vehicle 100. For instance, vehicle 100 may include one or more accelerometers and/or gyroscopes. The localizer devices 104A and 104B may be positioned such that they are close to or as close as possible to the inertial sensors. Further, the location of localizer devices 104A and 104B may depend on a line of sight between the headset 102 and the devices 104A and 104B. The system may make use of infrared (IR) signals to operate, which may require a line of sight between the sensors of the headset 102 and the localizer devices 104A and 104B.

Computing device 106 may include one or more processors and/or memory configured to carry out one or more functions or actions described herein. In some examples, computing device 106 may be a smart phone, tablet device, or other handheld device. Computing device 106 may be configured to provide images for headset 102 to display. The processing power required for some projected reality systems may be such that a dedicated computing device is required. Alternatively, computing device 106 may be a component of headset 102, and/or vehicle 100, and may communicate with headset 102 via a wired or wireless connection.

Vehicle system 108 may include one or more sensors or systems configured to determine the inertial forces acting on vehicle 100. For instance, vehicle system 108 may include one or more accelerometers, gyroscopes, and other sensors placed through the vehicle. This data may be transmitted to computing device 106 via a wired or wireless connection.

Computing device 106 may receive a headset pose from headset 102, or may receive sensor data from headset 102 and responsively determine the headset pose. Computing device 106 may also receive the sensor data from the vehicle system 108. And based on this data, computing device 106 may adjust the image provided to headset 102 for display to the user.

Figure 2:
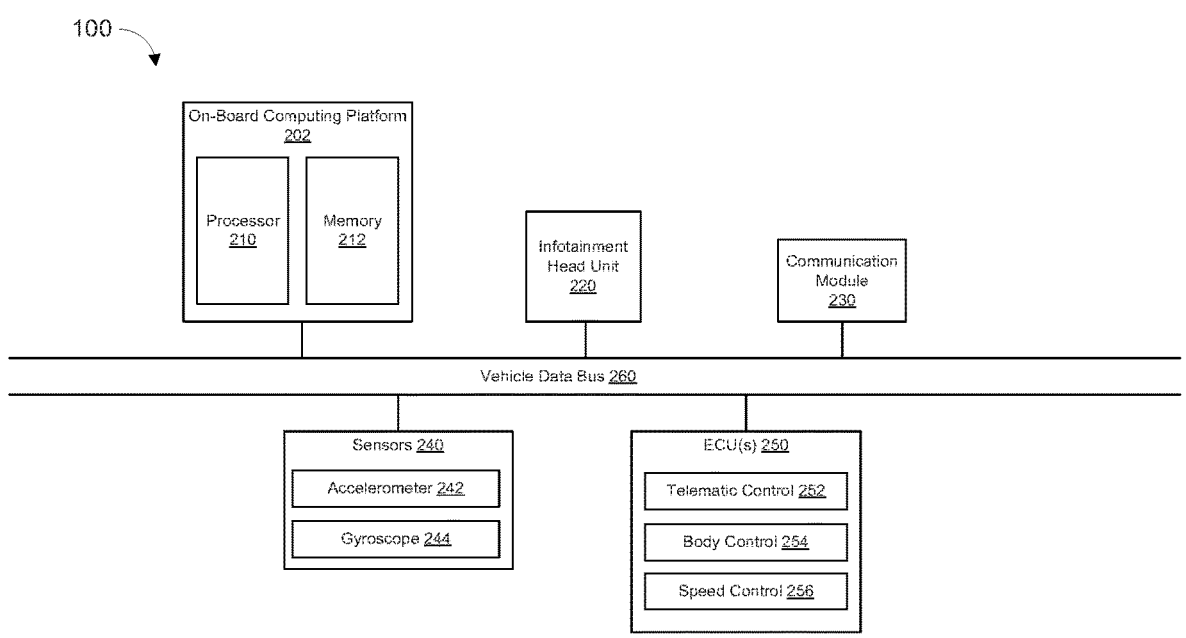
FIG. 2 illustrates a block diagram of electronic components of the vehicle of FIG. 1, according to an embodiment of the present disclosure.

FIG. 2 illustrates an example block diagram 200 showing electronic components of vehicle 100. In the illustrated example, the electronic components 200 include the on-board computing platform 202, infotainment head unit 220, communications module 230, sensors 240, electronic control unit 250, and vehicle data bus 260.

The on-board computing platform 202 may include a microcontroller unit, controller or processor 210 and memory 212. The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include digital and/or analog interfaces (e.g., input devices and output devices) to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing platform 202. Additionally, the infotainment head unit 220 may display the infotainment system on, for example, a center console display of vehicle 100.

Communications module 230 may include wired or wireless network interfaces to enable communication with the external networks. Communications module 230 may also include hardware (e.g., processors, memory, storage, etc.) and software to control the wired or wireless network interfaces. In the illustrated example, communications module 230 may include a Bluetooth module, a GPS receiver, a dedicated short range communication (DSRC) module, a WLAN module, and/or a cellular modem, all electrically coupled to one or more respective antennas.

The cellular modem may include controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module may include one or more controllers for wireless local area networks such as a Wi-FI® controller (including IEEE 802.11 a/b/g/n/ac or others), a Bluetooth® controller (based on the Bluetooth® Core Specification maintained by the Bluetooth Special Interest Group), and/or a ZigBee® controller (IEEE 802.15.4), and/or a Near Field Communication (NFC) controller, etc. Further, the internal and/or external network(s) may be public networks, such as the Internet; a private network, such as an intranet; or combinations thereof, and may utilize a variety of networking protocols now available or later developed including, but not limited to, TCP/IP-based networking protocols.

Communications module 230 may also include a wired or wireless interface to enable direct communication with an electronic device (such as a smart phone, a tablet computer, a laptop, etc.). The example DSRC module may include radio(s) and software to broadcast messages and to establish direct connections between vehicles. DSRC is a wireless communication protocol or system, mainly meant for transportation, operating in a 5.9 GHz spectrum band.

Sensors 240 may be arranged in and around the vehicle 100 in any suitable fashion. In the illustrated example, sensors 240 includes an accelerometer 242 and a gyroscope 244. The accelerometer 242 may include multiple accelerometers, which may measure acceleration of the vehicle in multiple directions. Gyroscope 244 may measure an orientation, angle, pitch, yaw, or other angular change experienced by the vehicle. Other sensors may be included as well.

One or more of the sensors 240 may be positioned in or on the vehicle based on a model of how the vehicle reacts to various forces. For instance, a given vehicle may experience forces in one area of the vehicle differently than another area. The difference in sensor precision and impact force may be mapped, and a sensor position may be selected such that it detects forces acting on the vehicle with the greatest precision.

Further, the position of one or more sensors, and the vehicle model that maps the differences in force, may be used by one or more systems, processors, or methods in order to more effectively stabilize and modify an image. For instance, a sensor placed in a more active or responsive part of the vehicle (relative to the location of the user/headset) may cause images to be adjusted less than if the sensor is placed in a less active or responsive part of the vehicle. The model of the vehicle may thus be used to stabilize the images.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power windows, power locks, power moon roof control, an immobilizer system, and/or power mirrors, etc. The speed control unit 256 may receive one or more signals via data bus 260, and may responsively control a speed, acceleration, or other aspect of vehicle 100.

Vehicle data bus 260 may include one or more data buses that communicatively couple the on-board computing platform 202, infotainment head unit 220, communication module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 350 may be a Media Oriented Systems Transport (MOST) bus, or a CAN flexible data (CAN-FD) bus (ISO 11898-7).

Figure 3:
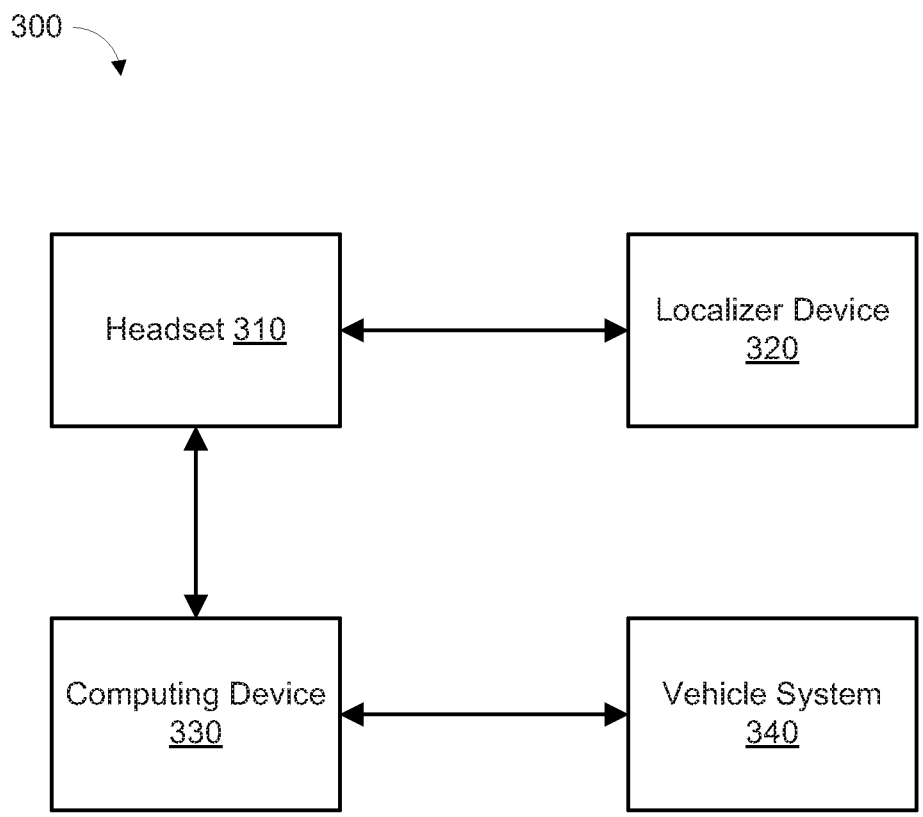
FIG. 3 illustrates a block diagram of an example projected reality system, according to an embodiment of the present disclosure.

FIG. 3 illustrates a block diagram of an example system 300 for stabilizing projected reality. System 300 may include a headset 310, one or more localizer devices 320, a computing device 330, and a vehicle system 340. These components may be similar or identical to headset 102, localizer device 104A and 104B, computing device 106, and/or vehicle system 108 described above.

Headset 310 may be configured to display a projected reality image to a user. The projected reality image may be an augmented reality image (i.e., a supplemented real-world view of a user) or may be a virtual reality image (i.e., an image that replaces a user's real-world view). As such, headset 310 may include a head mounted display having a single display, multiple displays, a projected view, or any other type of projected image device. In some examples, headset 310 may include an over-the-ear device (e.g., projected reality glasses), a head strap, goggle-like display screen or screens, or any other form factor for displaying an image to a user.

Headset 310 may also include one or more processors, memory, and other electronic components. Headset 310 may include a communications module configured to communicate with localizer device 320 and/or computing device 106. The communication may include synchronization data, timing data, and/or other data.

Localizer device 320 may include one or more light emitting devices, which may be used for the purpose of detecting the headset "pose," namely the location, position, orientation, angle, or other metric that may be used to describe the headset in physical space. As noted above, localizer device 320 may include multiple devices, positioned throughout the vehicle. In one example, the localizer device includes two laser devices mounted to the vehicle. The localizer devices may communicate with each other via a wired or wireless connection, as well as with headset 310, computing device 330 and/or vehicle system 340.

In some examples, localizer device 320 may be positioned in the vehicle based on a model or map of how forces affect parts of the vehicle differently. Vehicle system 340 may include one or more inertial sensors (accelerometers, gyroscopes, etc.) configured to detect forces acting on the vehicle and passengers. The sensors may be positioned throughout the vehicle to provide a map of how a given impacting force affects different parts of the vehicle. For instance, when the vehicle takes a sharp left turn, the left side of the vehicle may experience a different g-force than the right side. Or when the vehicle travels over a bumpy road, the front of the vehicle may experience a different amount of force than the back of the car. Alternatively, the vehicle may already be mapped, and the map may indicate, for instance, that when a force measured by a sensor at the front of the car is X, the same sensor would measure 2X if placed at a rear of the vehicle.

The position of the localizer device may thus be determined based on the vehicle force map. The forces acting on the vehicle (i.e., the movement of the vehicle), may correspond to the forces acting on the localizer device. The vehicle force map may be used to determine a multiplier or other mathematical relationship between the force acting on the vehicle system 340 sensor and the localizer device 320.

Vehicle system 340, as noted above, may include one or more inertial sensors configured to detect forces acting on the vehicle and passengers. In one example, the telematics control unit of the vehicle may include sensors that detect inertial forces acting on the vehicle. These sensors may detect yaw and pitch data corresponding to the vehicle, and/or various accelerations acting on the vehicle (e.g., forward, backward, sideways, up and down). In some examples, the sensors may have a detection rate at which they detect the various forces. The detection rate in some cases may be greater than 90 times per second. At this rate, information may be gathered fast enough for system 300 to react appropriately by adjusting and/or stabilizing the images.

Computing device 330 may be configured to receive data from vehicle system 340 at a particular rate. The rate may be greater than 90 times per second. At this rate, the computing system may adjust the images sent to headset 310 faster than the images are displayed.

Computing device 330 may also determine a stabilized image, or a stabilized series of images to provide or transmit to headset 310. Headset 310 may provide the images to the user in quick succession, such that the user views a continuous stream or video. The stabilized images may be determined based on the received headset pose and the received vehicle inertial data.

In some examples, computing device 330 may provide images to the headset at a rate greater than 90 times per second. At this rate, changes may be included in the images without a user noticing jittering or jumping of the images, which may aid in preventing motion sickness or other image based issues. It should be understood that detection and transmission rates less than or greater than 90 times per second are included as well, and that a rate of 90 times per second is the rate for an example embodiment.

Figure 4:
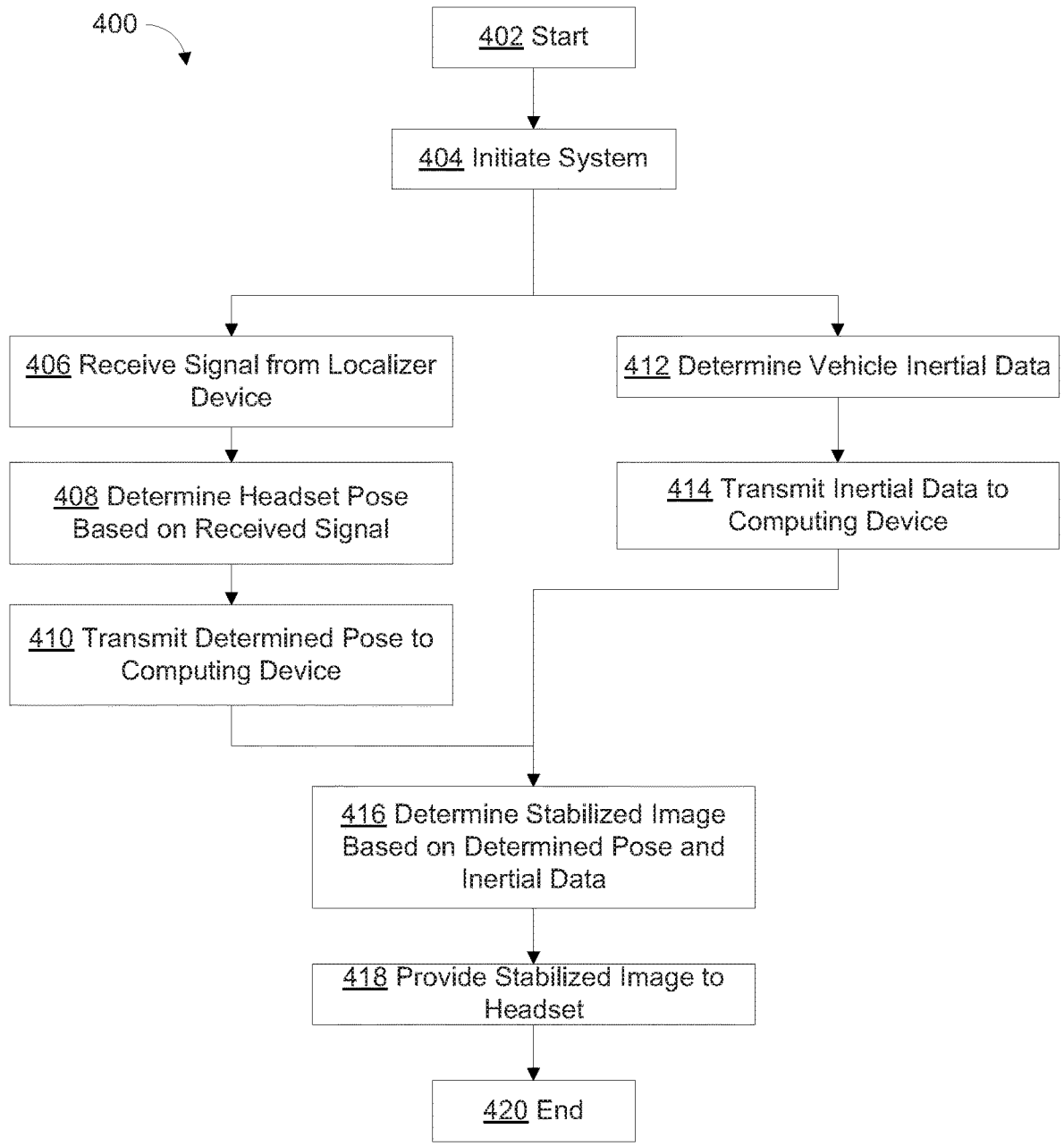
FIG. 4 illustrates a flowchart of an example method according to an embodiment of the present disclosure.

FIG. 4 illustrates a flowchart of an example method 400 that may be implemented by the devices, systems, and components described herein. Method 400 may provide a method for stabilizing an in-vehicle projected reality image. The flowcharts of FIG. 4 are representative of machine readable instructions that are stored in memory (such as memory 212) and may include one or more programs which, when executed by a processor (such as processor 210) may cause vehicle 100 and or one or more other systems described herein to carry out one or more functions described herein. While the example program is described with reference to the flowchart illustrated in FIG. 4, many other methods for carrying out the functions described herein may alternatively be used. For example, the order of execution of the blocks may be rearranged, blocks may be added, changed, eliminated, and/or combined to perform method 400. Further, because method 400 is disclosed in connection with the components of FIGS. 1-3, some functions of those components will not be described in detail below.

At block 402, method 400 may start. At block 404, method 400 may include initiating the system. This may include turning on one or more devices, sensors, or systems.

At block 406, method 400 may include receiving a signal from a localizer device. The localizer device may be a light emitting device located in the vehicle. The light emitting device may emit pulses of light that may be detected by sensors located on a headset of an artificial reality system. The signal (pulses) may be received by the headset, and may include IR signals, for example.

At block 408, method 400 may include determining a headset pose based on the received signal. The headset pose may describe the position of the headset within the car (i.e., a three dimensional location) as well as the orientation of the headset (i.e., a direction in which the headset is aimed or a user is looking). Other descriptive metrics of the headset may be determined as well.

At block 410, method 400 may include transmitting the determined pose to the computing device. This may be transmitted via a wired or wireless connection. While blocks 406-410 describe a scenario in which the headset determines the headset pose itself and transmits the pose to the computing device, other examples may include the headset receiving signals from the localizer device, and transmitting the information to the computing device. The computing device may then determine the headset pose. As such, block 408 may be performed by the computing device itself.

At block 412, method 400 may include determining vehicle inertial data. The vehicle inertial data may be determined by one or more sensors coupled to the vehicle itself, such as accelerometers and/or gyroscopes, for example. Then at block 414, method 400 may include transmitting the inertial data to the computing device.

At block 416, method 400 may include determining a stabilized image based on the determined headset pose and the vehicle inertial data. In practice, this may include the computing device starting with a base image, adjusting the base image based on the vehicle inertial data, and then adjusting the image again based on the headset pose. Alternatively, the computing device may calculate an adjustment based on the headset pose and the vehicle inertial data, and apply the adjustment to the base image. In some examples, this process may be done at greater than 90 times per second.

At block 418, method 400 may include providing the stabilized image to the headset. As noted above, this may be done 90 times per second or more. However greater or smaller rates may be used as well. Then at block 420, method 400 may end.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system comprising:
a headset comprising a first sensor configured to receive light beams; and
a vehicle comprising:
a second sensor configured to collect inertial data of the vehicle; and
a localizer device fixedly positioned in the vehicle and configured to transmit the light beams in sweeping motions, wherein inertial forces of said localizer device correspond with the inertial data, and movement of said localizer device and said second sensor match; and
a computing device communicatively coupled to the headset, said second sensor, and said localizer device and configured to:
based on the light beams received at said first sensor, determine a headset pose; and
based on the headset pose and the inertial data, generate a headset image that synchronizes with the inertial forces,
wherein said localizer device is further configured to transmit the light beams in a horizontal sweeping motion and in a vertical sweeping motion,
wherein the computing device is further configured to determine the headset pose based on timing differences between a first occurrence of receiving the light beams in the horizontal sweeping motion at said first sensor and a second occurrence receiving the light beams in the vertical sweeping motion at said first sensor.

2. The system of claim 1, wherein said localizer device includes a pair of laser devices fixedly mounted in the vehicle.

3. The system of claim 1, wherein the headset pose includes a location and orientation of the headset.

4. The system of claim 1, wherein the computing device is a smart phone.

5. The system of claim 1, wherein the inertial data includes yaw data, pitch data, and acceleration data.

6. The system of claim 1, wherein said second sensor includes one or more gyroscopes and accelerometers.

7. The system of claim 1, wherein said second sensor collects the inertial data a rate greater than 90 times per second.

8. The system of claim 1, wherein said localizer device is positioned adjacent to said second sensor to cause inertial forces detected by said second sensor to correspond with inertial forces acting on said localizer device.

9. The system of claim 4, wherein the computing device receives the inertial data from a telematics control unit of the vehicle.

10. The system of claim 1, wherein the computing device provides the headset image to the headset at a rate greater than 90 times per second.

11. A method comprising:
receiving, via a first sensor of a headset, light beams;
detecting, via a second sensor of a vehicle, inertial data of the vehicle;
transmitting, via a localizer device fixedly positioned in the vehicle, the light beams in sweeping motions, wherein inertial forces of said localizer device correspond with the inertial data, and movement of said localizer device matches movement of said second sensor;

determining, via a processor communicatively coupled to the headset, said second sensor, and said localizer device, a headset pose based on the light beams received at said first sensor; and generating, via the processor, a stabilized image that synchronizes with the inertial forces based on the headset pose and inertial data; and presenting the stabilized image at the headset, wherein said localizer device is further configured to transmit the light beams in a horizontal sweeping motion and in a vertical sweeping motion, wherein the computing device is further configured to determine the headset pose based on timing differences between a first occurrence of receiving the light beams in the horizontal sweeping motion at said first sensor and a second occurrence receiving the light beams in the vertical sweeping motion at said first sensor.

12. The method of claim 11, wherein said localizer device includes a pair of laser devices mounted to the vehicle.

13. The method of claim 11, wherein said second sensor includes one or more gyroscopes and accelerometers.

14. The method of claim 11, wherein the inertial data is received by the headset at a rate greater than 90 times per second.

15. The method of claim 11, wherein the inertial data is received by the processor from a telematics control unit of the vehicle.

16. The method of claim 11, further including providing the stabilized image to the headset at a rate greater than 90 times per second.

17. The system of claim 1, wherein said second sensor is positioned such that the inertial data collected by said second sensor identifies the inertial forces acting on said localizer device.

18. The system of claim 1, wherein headset image presented by the headset includes an augmented reality image.

19. The system of claim 1, wherein headset image presented by the headset is stabilized, based on the headset pose and the inertial data, to move in a manner that corresponds with inertial forces acting on the headset.

* * * * *